INVENTOR.
G. Kasten Tallmadge
BY Flehr, Hohbach, Nest,
Albritton & Herbert
Attorneys 3,477,145
TEACHING DEVICE
Guy Kasten Tallmadge, Los Altos, Calif., assignor to American Institutes for Research, Palo Alto, Calif., a corporation of Pennsylvania
Filed Mar. 10, 1967, Ser. No. 622,218
Int. Cl. G09b 23/06; G01c 21/00
U.S. Cl. 35—19                    7 Claims

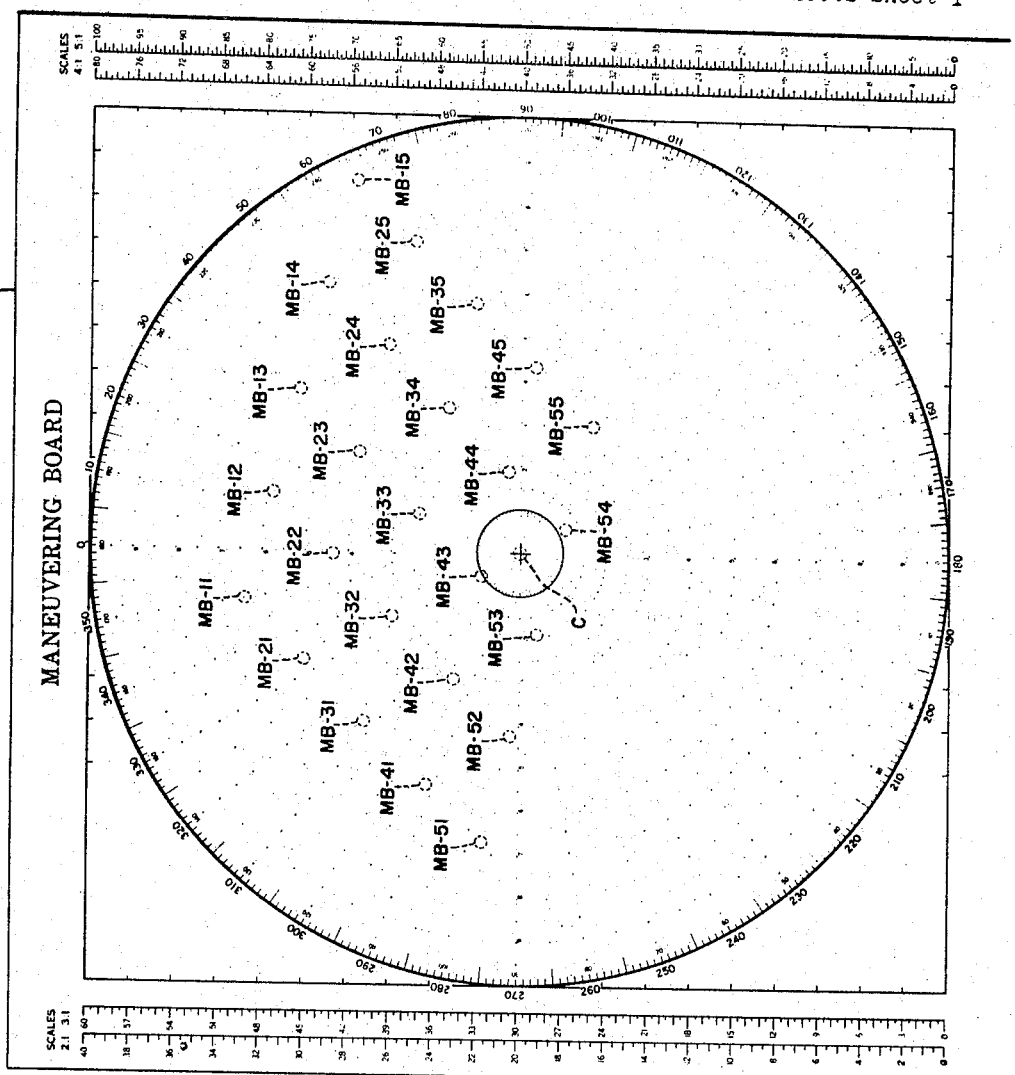
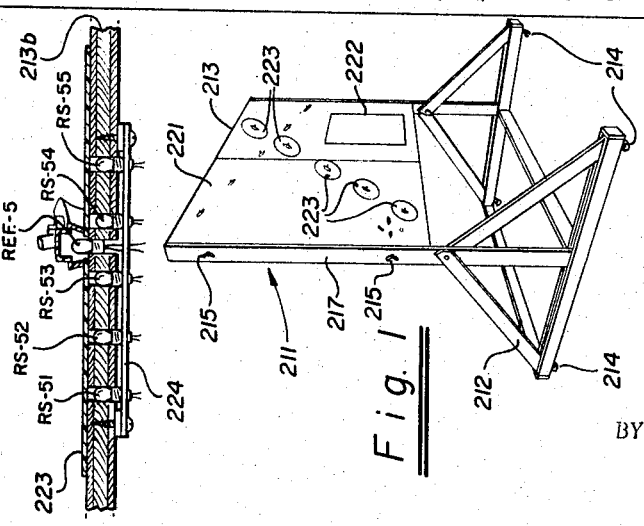

ABSTRACT OF THE DISCLOSURE

A device is disclosed for teaching methods of solution to maneuvering board problems wherein successive positions of a maneuvering body and a reference body are displayed on a large board which also displays a standard maneuvering board. A lamp is provided in each position of the two bodies and lamps representing sightings of the maneuvering body by the reference body's radar are furnished adjacent to each position of the reference body. Additional lamps are mounted to illuminate points on the maneuvering board representing points to be plotted by the radar operator corresponding to the radar sightings. Two six-position, multi-stage switches control respectively the lamps illuminating the position of the maneuvering body and the reference body, the appropriate simulated radar blips, and the corresponding plotted points on the maneuvering board.

---

The present invention concerns a teaching device and specifically relates to a means for demonstrating the underlying principles and most efficient procedures involved in solving maneuvering board problems.

Background of the invention

The field of art to which this invention pertains is educational devices for teaching concepts involving relative motion and the relative direction of two bodies at least one of which is considered to be in motion. The instant device is particularly useful to teach concepts of relative motion to inexperienced seamen and airmen some of whom have limited formal education in trigonometry, geometry, or physics. When the task was to inculcate this class of individuals in solution to maneuvering board problems difficulty was encountered in having the class relate the principles and procedures involved to events and relationships in the real world. Consequently, a high incidence of gross error in direction was found in the class examinations. Heretofore, this subject has been taught by rote or a mechanical, step-by-step method. The inter-relationship of the steps was not taught extensively and the overall procedure was soon forgotten by the class members.

Summary of the invention

The concept of relative motion between two bodies, which may be ships or aircraft, moving relative to each other is taught with greater ease and in a clear fashion through use of the present invention which includes a display board upon which the class may see the relationship between a maneuvering body and a reference body at several points in time. A simulated radar scope is shown in connection with the reference body and simulated radar blips are provided corresponding to the positions of the maneuvering body. The blips are also represented as plotted points on a maneuvering board and a facility is provided for preserving a sequence of points on the maneuvering board so that a plot may be drawn through them to illustrate relative motion lines, the direction of relative motion, and the speed of relative motion.

An object of the invention is to provide a device to facilitate teaching of concepts inherent in the solution of maneuvering board problems.

Another object of the invention is to enable a student to acquire the habit of visualizing with respect to himself and the reference body on which he resides the course of a maneuvering body as seen by or reported to him as blips on the radar scope, and also to visualize and realize the true course of the reference body and maneuvering body.

Further objects of the invention will become apparent from the following description taken in association with the accompanying drawings.

Brief description of the drawings

FIGURE 1 is a perspective view of the teaching device of the present invention;

FIGURE 3 is an elevational view of a maneuvering board present in the instant device;

FIGURE 4 is an enlarged sectional view taken along the lines 4—4 in the directions of the arrow in FIGURE 2.

Description of the preferred embodiment

Figure 2:
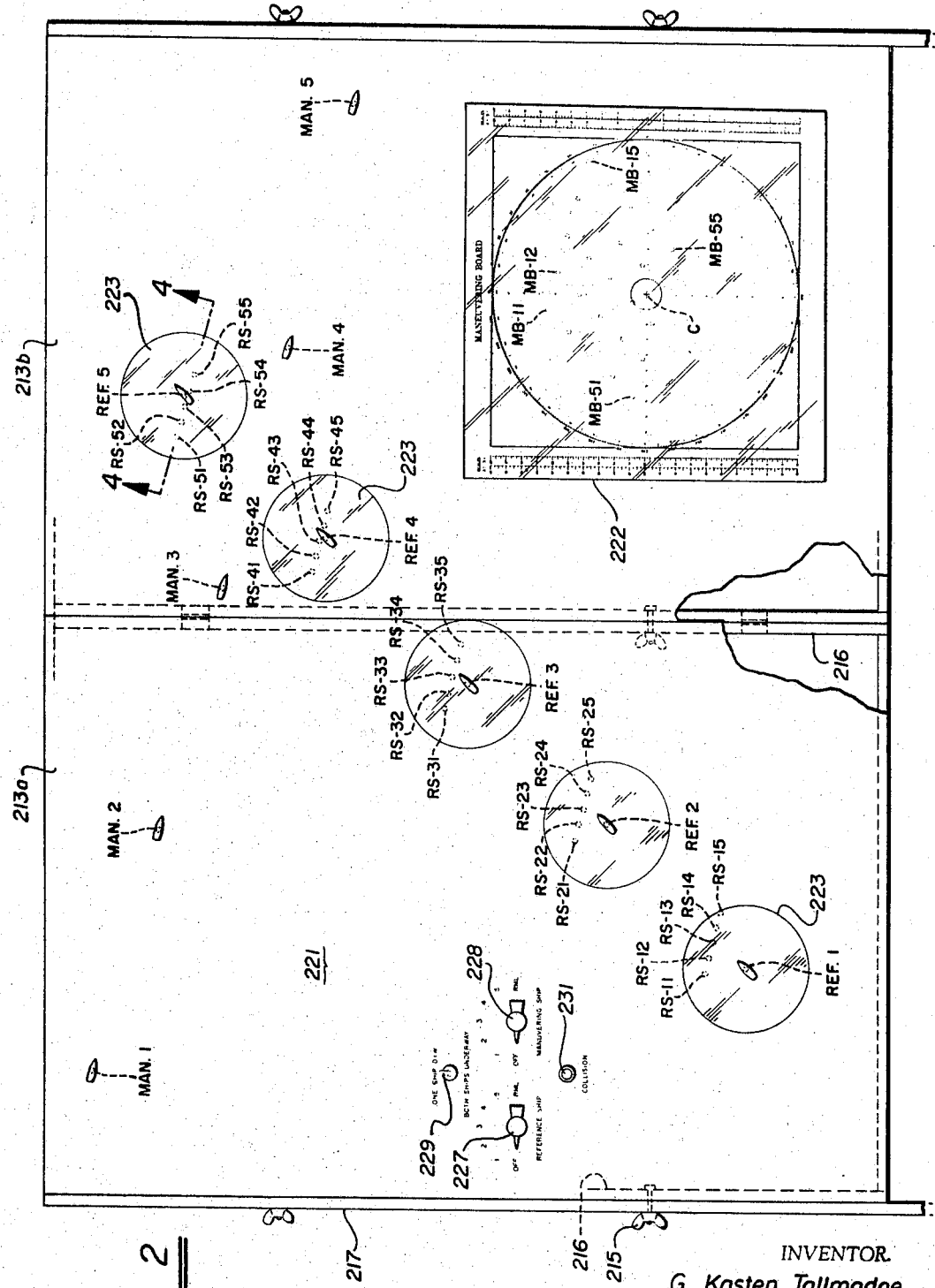
FIGURE 2 is an elevational view on an enlarged scale, partially broken away, of the device shown in FIGURE 1.

An educational device 211 is shown in FIGURE 1 and has been characterized in the profession as a relative motion trainer. It includes a movable supporting stand 212 upon which is mounted a vertically arranged display panel 213. The support stand 212 is provided with casters 214 at each of its four corners to lend ready movability to the educational device 211. The display panel is mounted on the support stand 212 for easy disassembly being that the bolts 215 holding the marginal pieces 216 (as seen in FIGURE 2) to the standards 217 are each equipped with wing nuts. The display panel 213 is made in two halves, 213a and 213b which are hinged so that the halves may be folded together for convenient carrying in an automobile. Suitable fasteners are provided for holding the halves in the open position as shown in FIGURE 2. A suitable size for the display panel 213 is five (5) feet by seven (7) feet and it may be fabricated from Masonite sheet or plywood material.

For teaching purposes the display panel 213 may be considered as divided into three fields. A first field 221, which occupies the largest area, represents the "real world" and may symbolize a large body of navigable water where ships are concerned or the atmosphere where aircraft are concerned. A second field 222 contains a replica, greatly enlarged, of the standard maneuvering board and includes a compass rose graduated to degrees and a series of scales or ranges. A plurality of circular third fields 223 are arranged on the display surface to represent a plan position indicator or radar scope of a reference body at successive points in time.

Maneuvering board problems involve the concept of relative motion between two bodies, at least one of which is considered to be in motion. By convention the observer is considered to be stationed on the reference body which in this case is taken to be a ship and is designated by the abbreviation "REF." The observed body may be called the maneuvering body and in this case is also taken to be a ship which is designated by the abbreviation "MAN."

The reference ship REF. is displayed on the first field in a manner to show a series of five successive positions of the ship as it cruises a steady course, the positions being spaced apart a distance scaled to represent a speed of 16 knots and the positions being shown at three, six, nine, twelve or fifteen minute intervals depending on the distance scale being employed. The five positions are numbered respectively, REF. 1, REF. 2, REF. 3, REF. 4, REF. 5, as appears clearly in FIGURE 2. As shown in FIGURE 4, to lend realism to the teaching device, the reference ship in each of its five positions may be represented by a translucent miniature ship colored appropriately, for example, yellow. A small lamp is mounted through the display panel 213 behind each "ship" for indicating the specific position of the reference ship under consideration at the moment during instruction. The circuit and switch apparatus associated with the lamp will be described below.

The maneuvering body or ship MAN. is displayed on the first field in a manner to show a series of five successive positions of the maneuvering ship as it cruises a steady course, the positions being spaced apart a distance scaled to represent a speed of about 20 knots and the positions being shown at three, six, nine, twelve or fifteen minute intervals. The five positions are numbered respectively, MAN. 1, MAN. 2, MAN. 3, MAN. 4, MAN. 5, as appears in FIGURE 2. The course of the maneuvering body is laid to intersect that of the reference body. The respective courses are scalded to represent a collision course when the reference body starts from position two and the maneuvering body starts from position one. To lend realism to the teaching device, the maneuvering ship and each of its five positions may be represented by a translucent miniature ship colored appropriately, for example, red. A small lamp is mounted through the display panel 213 behind each "ship" for indicating the specific position of the reference ship under consideration at the moment during instruction. The circuit and associated switch circuits for the maneuvering ship lamps will be described below.

Mentioned above was that the second field 222 contained an enlarged replica of the standard maneuvering board, as shown in FIGURE 3. The maneuvering board is covered by a layer of clear transparent material such as clear acetate sheet. This covering was found effective for drawing upon with grease pencils and the like to illustrate to the class relative motion lines, course and speed vectors, and the like. The covering is erasable.

Mounted in holes through the display panel 213 behind the maneuvering board are a plurality of small lamps each of which signifies one position of the maneuvering ship MAN. as seen by the radar of the reference ship REF. and as it should be plotted on the reference ship's maneuvering board. Being that the reference ship REF. and maneuvering ship MAN. are each displayed in five positions there are twenty-five such lamps mounted to illuminate plotting points on the maneuvering board, each lamp being designated by a letter prefix, MB, and a numeral suffix explained below.

On the maneuvering board the lamp designated MB 11 represents the first position of the maneuvering ship MAN. 1 as seen or as by plotted aboard the reference ship in its first position, REF. 1. Similarly, the maneuvering board lamp MB 12 represents the second position of the maneuvering ship, MAN. 2, as seen by the plan position indicator or radar scope of reference ship in the position REF. 1 and as plotted on the maneuvering board when the reference ship is in the position REF. 1. Thus in the maneuvering board lamp reference code the tens digit refers to the position of the reference ship or body and the units digit refers to the position of the maneuvering body or ship.

Mentioned above was that the circular third fields 223 signify the plan position indicator or radar scope on the reference body or ship. Being that the reference ship is shown in five positions there are five of the third fields 223 mounted on the display panel. The third field 223 may be formed from translucent materials and may be colored for realism to suggest the standard plan position indicator.

In each of the five fields 223 there are arranged, as shown in FIGURE 4, "blip" indicating lamps RS equal in number to that of the positions of the maneuvering ship, viz five. The blip lamps RS may be mounted behind the translucent third field in apertures placed in the panel 213 and retained thereby a mounting strip 224 secured to the back surface of the panel. The two reference numerals associated with each blip lamp RS indicates by the units digit the corresponding position number of the maneuvering ship or body. The tens digit indicates the position number of the reference ship or body. Thus blip lamp RS 32 refers to the second position, MAN. 2, of the maneuvering ship and the third position, REF. 3, of the reference ship.

To heighten realism in this teaching device, each blip lamp is disposed on an imaginary bearing line extending between the adjacent reference ship and the corresponding position of the maneuvering ship. Each blip lamp is located a scaled distance from the reference ship corresponding to the distance between the adjacent reference ship and the corresponding position of the maneuvering ship. This arrangement enables the class members to recognize proximity and direction.

Four manually operable switch mechanisms are included in the teaching device and these are mounted on the left hand portion of the display panel to illuminate selected individual lamps and combinations of lamps to arrest the attention of the class on the problem being discussed. These switches are the reference ship switch 227, the maneuvering ship switch 228, the dead-in-the-water, both ships underway switch 229 (indicated on FIGURE 5 because of its function as RML switch) and the collision switch 231.

Figure 5:
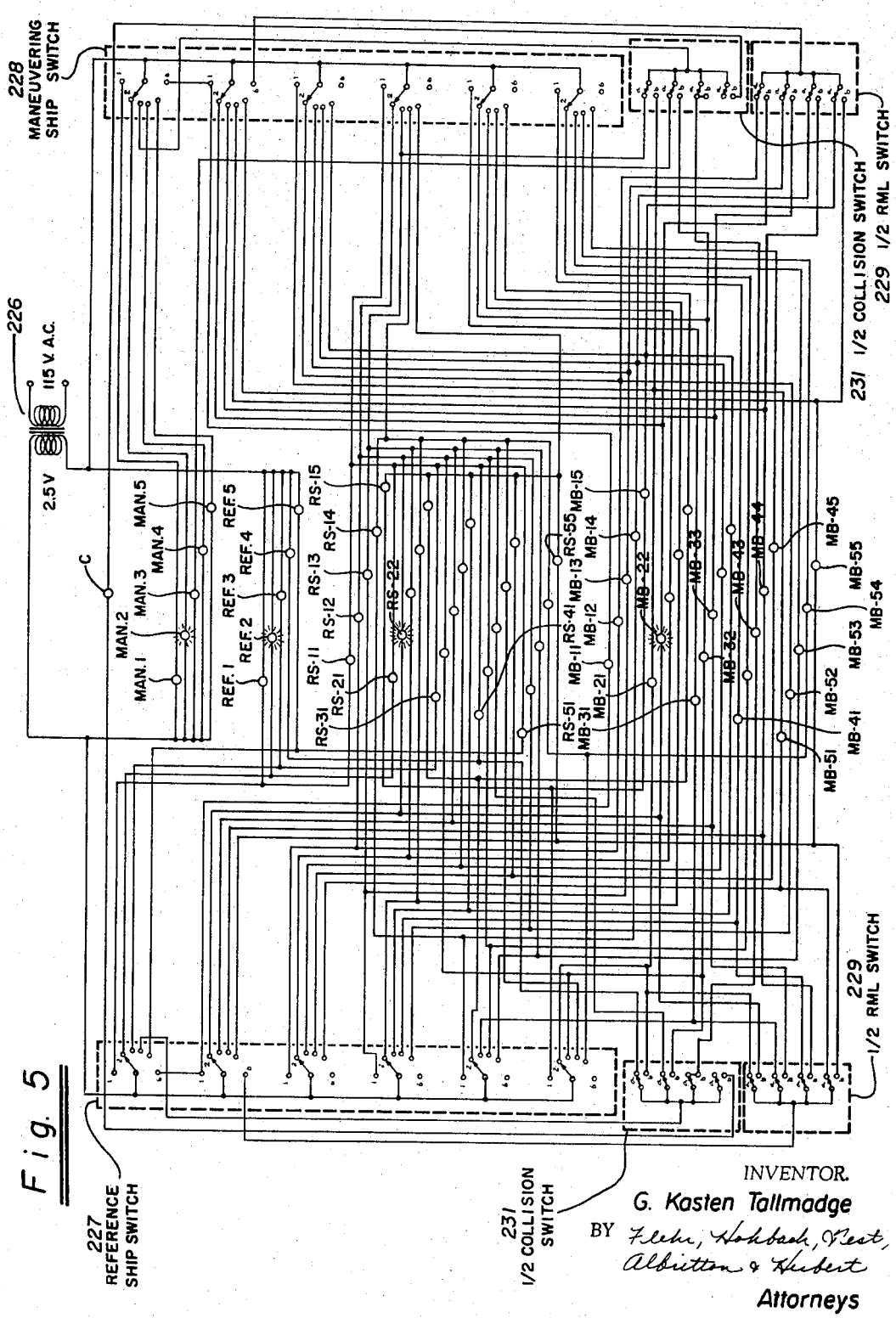
FIGURE 5 is a circuit diagram pertaining to the subject device.

In FIGURE 5 there is shown an electrical circuit wherein the four switches 227, 228, 229, 231 are associated with the various lamps mentioned in the operation of the teaching device. Although a direct current circuit would be satisfactory, the electrical circuit illustrated operates on 115 volts, single phase, alternating current and includes a step-down transformer 226 permitting 2.5 volt lamps to be used. The reference characters mentioned above in connection with the lamps are applied to the lamps as shown in the circuit diagram of FIGURE 5, the lamps being represented by circles.

The reference ship switch 227 is a six-position, multi-stage switch which is provided with a panel knob for placing it in any one of its six active positions. In positions 1 through 5, as shown on FIGURE 2, the reference shop switch 227 lights respectively lamps REF. 1 through REF. 5.

The maneuvering ship switch 228 is a six-position, multi-stage switch provided with a panel knob for placing it in any one of its six active positions and is electrically connected in the circuit so that when placed in positions 1 through 5, as shown in FIGURE 2, the lamps MAN. 1 through MAN. 5, respectively, are illuminated.

The switch 229 (indicated on FIGURE 5 because of its function as the RML switch) is a single pole, double throw toggle switch which is electrically connected to the sixth position of each switch 227 and 228. One function of the switch 229 is to illuminate a sequence of lamps on the maneuvering board to represent a relative motion line, that is, a line corresponding to the relative course of one body, REF., with respect to the other, MAN.

The collision switch 231 is a single pole, double throw, push-button actuated switch and it is electrically connected to the fourth position of switch 227 and the third position of switch 228.

As shown in FIGURE 5, the reference ship switch 227 and the maneuvering ship switch 228 are each shown in position 2 and in this condition the following lamps are lit: REF. 2, MAN. 2, RS 22, and MB 22. As an aid to understanding the circuit, the folowing table has been derived from the diagram of FIGURE 5 to set forth the specific lamps which are lit as the switches 227 and 228 are placed in each of their six positions.

The following table also takes into account the two positions of switch 229 (e.g. the dead-in-the-water condition and the "Both Ships Underway" condition).

| MANEU. SHIP SWITCH POSITIONS | REFERENCE SHIP SWITCH—POSITION 1 (REF. 1 LIT) | | |
|---|---|---|---|
| 1 | MAN. 1 | RS 11 | MB 11 |
| 2 | MAN. 2 | RS 12 | MB 12 |
| 3 | MAN. 3 | RS 13 | MB 13 |
| 4 | MAN. 4 | RS 14 | MB 14 |
| 5 | MAN. 5 | RS 15 | MB 15 |
| 6 (RML) | REF. 1 and MB 11, MB 12, MB 13, MB 14, MB 15 lit when switch 229 in "DIW" position (e.g. "a" contacts engaged). | | |
| | REFERENCE SHIP SWITCH—POSITION 2 (REF. 2 LIT) | | |
| 1 | MAN. 1 | RS 21 | MB 21 |
| 2 | MAN. 2 | RS 22 | MB 22 |
| 3 | MAN. 3 | RS 23 | MB 23 |
| 4 | MAN. 4 | RS 24 | MB 24 |
| 5 | MAN. 5 | RS 25 | MB 25 |
| 6 (RML) | Only REF. 2 remains lit. | | |
| | REFERENCE SHIP SWITCH—POSITION 3 (REF. 3 LIT) | | |
| 1 | MAN. 1 | RS 31 | MB 31 |
| 2 | MAN. 2 | RS 32 | MB 32 |
| 3 | MAN. 3 | RS 33 | MB 33 |
| 4 | MAN. 4 | RS 34 | MB 34 |
| 5 | MAN. 5 | RS 35 | MB 35 |
| 6 (RML) | Only REF. 3 remains lit. | | |
| | REFERENCE SHIP SWITCH—POSITION 4 (REF. 4 LIT) | | |
| 1 | MAN. 1 | RS 41 | MB 41 |
| 2 | MAN. 2 | RS 42 | MB 42 |
| 3 | MAN. 3 | RS 43 | MB 43 |
| 4 | MAN. 4 | RS 44 | MB 44 |
| 5 | MAN. 5 | RS 45 | MB 45 |
| 6 (RML) | Only REF. 4 remains lit. | | |
| | REFERENCE SHIP SWITCH—POSITION 5 (REF. 5 LIT) | | |
| 1 | MAN. 1 | RS 51 | MB 51 |
| 2 | MAN. 2 | RS 52 | MB 52 |
| 3 | MAN. 3 | RS 53 | MB 53 |
| 4 | MAN. 4 | RS 54 | MB 54 |
| 5 | MAN. 5 | RS 55 | MB 55 |
| 6 (RML) | Only REF. 5 remains lit. | | |
| | REFERENCE SHIP SWITCH POSITION 6 (RML) | | |
| 1 | MAN.1 and MB 11, MB 21, MB 31, MB 41, MB 51 when switch 229 is in "DIW" position (e.g. "a" contacts engaged). | | |
| 2 | MAN. 2 | | |
| 3 | MAN. 3 | | |
| 4 | MAN. 4 | | |
| 5 | MAN. 5 | | |
| 6 (RML) | MB 11, MB 22, MB 33, MB 44, MB 55 when switch 229 is in "Both Ships Underway" position (e.g "b" contacts engaged) | | |

It will be seen from the above table that three series of lamps may be lit to display relative motion lines on the maneuvering board 222. The first of these is established when switch 229 is placed in the DIW position (a contacts engaged), the switch 227 placed in position 1 while the switch 228 is in position 6. The relative motion line then displayed comprises lamps MB 11, MB 12, MB 13, MB 14, and MB 15. This relative motion line represents the situation wherein the reference body is considered to be dead in the water while the maneuvering body is considered to be in motion.

A second relative motion line may be displayed when switch 229 is in the DIW position (a contacts engaged) and switch 227 is in position 6 while switch 228 is in position 1. The relative motion line then displayed comprises lamps MB 11, MB 21, MB 31, MB 41 and MB 51. This relative motion line represents the condition wherein the maneuvering body is considered to be stationary while the reference body is considered to be in motion.

A third relative motion line may be displayed on maneuvering board 222 when switch 229 is in the "Both Ships Underway" position (b contacts engaged) and switches 227 and 228 are each in position 6. The relative motion line then displayed comprises lamps MB 11, MB 22, MB 33, MB 44, and MB 55. This relative motion line represents the condition wherein both the reference body and maneuvering body are considered to be in motion.

A fourth relative motion line, one involving an illustration of a collision between the reference body and maneuvering body, also may be displayed on the maneuvering board. To dramatize the collision event a lamp C is located in the center of the compass rose on the maneuvering board, as appears in FIGURES 2 and 3. The relative motion line involving a collision is displayed by lamps MB 21, 32, 43, and C. It will be seen from FIGURE 5 that the third position of switch 227 is electrically connected to one half of the collision switch 231 while the fourth position of maneuvering ship switch 228 is electrically connected to the other half of the collision switch 231. The b contacts in the switch 231 are in communication with respect to lamps MB 21, MB 32, MB 43, and C. Thus, with the reference ship switch 228 in the third position and the maneuvering ship switch in the fourth position, the push button of the collision switch 231, shown in FIGURE 2, may be depressed to display on the maneuvering board a collision situation wherein the lamps MB 21, MB 32, MB 43 and C will be illuminated.

Operation

It should be recognized that different instructors each may have a slightly different approach to the teaching of solutions to maneuvering board problems using the teaching device 211. One approach is to begin by taking the class through a situation where one of the bodies, the reference ship, is considered stationary or dead in the water while the maneuvering body is in motion. The switch 229 labelled "One Ship DIW" is actuated engaging the a contacts therein to achieve this condition and the switch 227 labelled "Reference Ship" is rotated into the position 1 which causes lamp REF. 1 to light. The switch 228 labelled "Maneuvering Ship" is rotated into position 1 and the lamps MAN. 1, RS 11 and MB 11 are lit. At this juncture, it is explained to the class that the lamp RS 11 represents a radar sighting of the maneuvering body at a bearing of 350° and at a range which may be selected from one of the five scales of the instructor's choice. The class is instructed to plot on their own maneuvering board sheets the point represented by lamp MB 11.

The switch 228 labelled "Maneuvering Ship" is then rotated to position two causing lamps MAN 2, RS 12, and MB 12 to light. The class members are directed to mark a point represented by MB 12 at bearing of 012 degrees in the designated range. In a similar fashion the maneuvering ship switch is rotated through positions three through five and lamps MB 13, MB 14, and MB 15 are lit designating points to be marked by the students on their maneuvering board sheets. When all five points have been marked the maneuvering ship switch 220 is rotated to the sixth position (Relative Motion Line) causing lamps MB 11 through MB 15 to light simultaneously so that a line may be drawn by the instructor with a grease pencil through the points previously marked on the maneuvering board 222. This line is called the Relative Motion Line. The class is then taught to determine the course of the maneuvering body by translating the relative motion line thus drawn to the origin or center of the maneuvering board by means of parallel rules. The bearing marker on the outer edge of the maneuvering board compass rose toward which this line extends is the true course of the maneuvering body. By taking into account the time lapsed between the first and last sightings, and the distance the maneuvering body advanced over its course, its rate of speed with respect to the navigable medium may be determined. The course and speed of the reference body can be determined in a similar manner except that the course is read from the inner bearing marker (which is the reciprocal of the bearing marker on the outer edge).

The solution to a second type of maneuvering board problem can be taught by use of the teaching device 211, this problem involving the condition wherein both the reference body and maneuvering body are in motion. The switch 229 labelled "One Ship DIW-Both Ships Underway" is turned to the both ships underway condition engaging the *b* contacts therein. The reference ship switch 227 is turned to position 1 lighting the lamp REF. 1. The maneuvering ship switch 228 is rotated to position one causing lamps MAN. 1, RS 11, and MB 11 to light. The instructor then makes a mark with a grease pencil on the maneuvering board over lamp MB 11 calling off the bearing and range to the class. The maneuvering ship switch and the reference ship switch are each turned to position 2, causing lamps REF. 2, MAN. 2, RS 22, and MB 22 to light while the lamps previously lit are in the off condition. The instructor then makes a mark on the maneuvering board over lamp MB 22, calling off the bearing and range to the class. In a similar fashion the reference ship switch and maneuvering ship switch are each rotated to positions three through five to light severally lamps MB 33, MB 44, MB 55 and the instructor marks the maneuvering board over these lamps. The subject switches are rotated into the sixth position to light simultaneously lamps MB 11, MB 22, MB 33, MB 44, MB 55 so that a relative motion line may be drawn through these points. The line thus drawn may be translated to the origin or center of the maneuvering board by use of parallel rules and the direction of relative movement may be read from the bearing marker on the outer edge of the maneuvering board compass rose toward which this line extends. The speed of relative motion may be determined by considering the relative distance traveled (length of the relative motion line measured against the selected distance scale) and the elapsed time between the first and the fifth radar sighting.

The true course and speed of the maneuvering body may be determined in the following manner:

(1) A vector line is drawn from the center of the maneuvering board to represent the true course and speed of the reference body. The length of this line is proportional to the speed of the reference body. It is drawn from the center of the maneuvering board toward that bearing marker on the outer edge of the maneuvering board compass rose which corresponds to the reference body's true course.

(2) A second vector line is drawn from the outer end of the reference body vector in a direction parallel to the relative motion line and of a length proportional to the speed of relative motion.

(3) A third vector is drawn from the center of the maneuvering board to the end of the second, or relative motion, vector. The length of this vector will be proportional to the maneuvering body's true speed. The bearing marker on the outer edge of the maneuvering board compass rose toward which this vector extends will be the maneuvering body's true course.

Although the teaching of solutions to two types of relative motion problems has been described, a variety of problems and their solutions may be displayed with the present invention as will be appreciated by those skilled in the art. The surface of the maneuvering board being a smooth plastic finish, it readily receives markings from the grease pencil so that the various course and speed vectors may be drawn on the maneuvering board and easily erased at the completion of the problem.

While there has been described what it is at present considered to be the preferred embodiment of the invention, it will be understood that various modifications may be made therein and it is intended to cover in the appended claims all such modifications as fall within the true spirit and scope of the invention.

I claim:
1. A device for portraying assumed relative motion between two bodies, comprising a display surface, first and second groups of indicating means on said display surface each having an indicating a non-indicating condition, each group of indicating means representing positions of a body assumed to be in motion relative to another body, a replica of a maneuvering board including polar coordinates and range scales co-visible with said display surface and representing at its center one of said bodies, a third group of indicating means each having an indicating and non-indicating condition arranged within said maneuvering board, each of said third indicating means being positioned with respect to the center of said maneuvering board to represent the direction and range of said other body with respect to said one body, and at least two multiple condition switch means operatively coupled to said three named groups of indicating means, indicating means of said first group being responsive to selective conditions of one of said switches serving to indicate selected positions of the body represented by said first group of indicating means, indicating means of said second group being responsive to selected conditions of the other of said switches serving to indicate selected positions of the body represented by said second group of indicating means, indicating means of said third group being responsive to the selected conditions of both said switch means serving to represent on said maneuvering board replica the direction and range of one body with respect to the body represented by the center of said maneuvering board, indicating means of said third group of indicating means also being responsive to a selected condition of at least one of said switches for preserving in the indicating condition a selected succession of said third indicating means to indicate the vector of the relative course of said two bodies.

2. The device of claim 1 wherein the number of individual indicating means in said third group is at least equal to the product of the number of individual indicating means in said first and second groups.

3. The device in claim 1 wherein said device includes a plurality of fourth groups of indicating means disposed on said display surface, each indicating means having an indicating and non-indicating condition, each of said fourth groups being disposed in proximate relation to an individual indicating means of said first group thereof, each of the individual indicating means in said fourth groups being disposed on an imaginary bearing line extending from an indicating means of said first group to one of said second group, and being spaced from said first indicating means of said first group a distance scaled from the distance between the related first and second indicating means, said two multiple condition switch means also being operatively coupled with said fourth groups of indicating means, indicating means of each of said fourth groups being responsive to the selected conditions of both said switch means serving to place in the indicating condition an indicating means from one of said fourth groups corresponding to the indicating means selected from said first and second groups.

4. An educational device for demonstrating the principles and solutions of maneuvering board problems comprising a display surface, a first field on said display surface representing a navigable medium, a second field on said display surface representing a maneuvering board, maneuvering body indicating means representing a course of a manuevering body over said first field, reference body indicating means representing a course of a reference body over said first field, and a plurality of maneuvering board indicating means displayed on said maneuvering board, each maneuvering board indicating means being arranged to represent a position of the maneuvering body relative to a reference body position and representing a point as it should be plotted on the maneuvering board, a selectable succession of said maneuvering board indicating means representing a vector of the course of said maneuvering body and said reference body, and at least two multiple condition switch means operatively coupled to said three named indicating means, said maneuvering body indicating means being responsive to selected conditions of one of said switches serving to indicate selected positions of said maneuvering body along its course, said reference body indicating means being responsive to selected conditions of the other of said switches serving to indicate selected positions of said reference body along its course, said maneuvering board indicating means being responsive to the selected conditions of both said switch means serving to represent said point for plotting, and said maneuvering board indicating means also being responsive to a selected condition of at least one of said switches for indicating through a selected succession of said maneuvering board indicating means the vector of the course of said maneuvering body and said reference body.

5. The educational device of claim 4 wherein said maneuvering body and said reference body indicating means are arranged in said first field to represent intersecting courses of said bodies.

6. The educational device of claim 5 wherein said maneuvering body and said reference body indicating means are arranged on said first field in a scale to represent an intersecting collision course of said bodies, and collision indicating means having an indicating and a non-indicating condition, and means for switching said collision indicating means selectively between said indicating and non-indicating conditions.

7. The educational device of claim 4 wherein said second field is provided with a translucent layer superimposed upon the maneuvering board indicating means, said layer providing a surface serving to receive erasable markings permitting solutions of problems to be drawn upon and erased from said second field.

References Cited
UNITED STATES PATENTS

| | | | |
|---|---|---|---|
| 1,995,308 | 3/1935 | Kiser | 35—25 |
| 2,460,841 | 2/1949 | Morey et al. | 35—10.2 |
| 2,676,419 | 4/1954 | Stephens et al. | 35—10.2 |

EUGENE R. CAPOZIO, Primary Examiner.

U.S. Cl. X.R.

35—10.2; 25